United States Patent [19]

Kondziela

[11] Patent Number: 4,899,369
[45] Date of Patent: Feb. 6, 1990

[54] RADIO-ANALOGUE METHOD OF AUDIO PRESENTATION AND CONTROL FOR AUDIOTEX SERVICES

[75] Inventor: James M. Kondziela, Fairfield, Conn.
[73] Assignee: NYNEX, New York, N.Y.
[21] Appl. No.: 348,716
[22] Filed: May 5, 1989
[51] Int. Cl.$^4$ ............................................ H04M 11/08
[52] U.S. Cl. .................................. 379/101; 379/201; 379/67; 379/105
[58] Field of Search .................. 379/90, 101, 92, 201, 379/97, 67, 72, 73, 76, 88, 102, 104, 74, 77

[56] References Cited

U.S. PATENT DOCUMENTS

| | | |
|---|---|---|
| 3,518,586 | 6/1970 | Nilssen et al. |
| 4,539,435 | 9/1985 | Eckmann ........................ 379/77 X |
| 4,540,851 | 9/1985 | Hashimoto ...................... 379/105 |
| 4,656,655 | 4/1987 | Hashimoto ...................... 379/105 |
| 4,682,370 | 7/1987 | Matthews ........................ 455/166 |

FOREIGN PATENT DOCUMENTS

| | | |
|---|---|---|
| 0202156 | 12/1982 | Japan ............................... 379/67 |
| 2189369 | 10/1987 | United Kingdom ............ 379/201 |

Primary Examiner—James L. Dwyer
Attorney, Agent, or Firm—Loren C. Swingle; Kenneth Rubenstein

[57] ABSTRACT

A method for controlling audiotex services which is analogous to the method by which users operate conventional commercial radios is disclosed. In accordance with the inventive method, upon dialing a general audiotex telephone number, the user hears what sounds like the slow changing of stations on a radio. The effect is produced by successively transmitting to the caller a short excerpt from each of a plurality of available audiotex services. The caller may stop the scanning of the audiotex services at any particular audiotex service by pressing a particular key on the telephone keypad. Other keys may be used to resume the scanning of the audiotex services in the forward or reverse directions and at a slow or fast speed. Some of the keys on the user's telephone keypad may be used as memory keys. When a user presses one of these memory keys, access to a particular audiotex service is immediately provided.

29 Claims, 8 Drawing Sheets

RADIO-ANALOGUE METHOD OF AUDIO PRESENTATION AND CONTROL FOR AUDIOTEX SERVICES

FIELD OF THE INVENTION

The present invention relates to a method by which an audiotex service may present audio information to a user and enable the user to control the transactions of that service.

BACKGROUND OF THE INVENTION

Audiotex is a generic term for any automated two-way information service that provides telephone callers with the ability to access information, select services or products, store or forward messages, or make other decisions by means of the telephone. Audiotex services are generally automated, i.e., the services may be rendered without the intervention of any live human being.

The user of audiotex services receives audio prompts via the telephone and indicates his/her decisions by pressing the keys of the telephone keypad. More rarely, the user might indicate decisions by dialing a rotary telephone or by speaking over the telephone to a voice recognition or voice actuation device. Voice recognition refers to the translation of the user's speech into text while voice actuation refers to detection of the user's vocal energy.

Examples of audiotex applications are services which enable telephone callers to hear sports and financial reports, make arrangements for travel and entertainment, and select and order merchandise over the telephone. Audiotex also includes voice messaging services which provide automated means of storing, forwarding, or processing recorded messages.

Conventional audiotex services present the telephone caller with audio prompts comprising an explicit menu of choices, such as "If you want financial information, press 1 on your telephone keypad; if you want sports, press 2; if you want weather information, press 3." The telephone caller then makes a decision by pressing a key on the telephone keypad. As a result of the user's decision, the audiotex service branches the user to the next menu, or decision point. Another audio prompt is given, and the user makes another decision. Prompts are successively given and the user makes decisions until the transaction is completed. Thus, in this method of presenting audiotex services, the user must traverse a hierarchical decision tree comprising explicit menus of choices.

The conventional method of presentation and control of audiotex services may be problematic to the user for several reasons. First, the hierarchies of menus used in current audiotex services are oftentimes lengthy, deep, and tedious to the caller. Consequently, the user may experience problems navigating through this hierarchy. The user may, for example, get lost in the decision tree structure of the menu hierarchy because he made an incorrect decision and was branched to an unintended prompt by accident.

Secondly, besides navigational problems, the conventional method of presentation and control for audiotex services may pose problems to the novice user who expects a more consistent assignment of keys to functions. In conventional audiotex services, keys are typically assigned a different meaning at each decision point. For example, the user may hear in one audio prompt that he should press the "1" key for financial information or the "2" key for sports information. Pressing "2", he may then hear that he should press the "1" key for baseball information has been assigned to different functions: financial information in one menu and baseball information in the next. This reassignment of particular keys to different functions in different menus may result in confusion and dissatisfaction with the operation of the service.

In view of the shortcomings of the conventional methods by which audiotex services present information to users and by which users control transactions in audiotex services, it is an object of the present invention to provide a new method by which an audiotex service may present audio information to the user and enable the user to control the transactions of that service. More particularly, it is an object of the present invention to provide a method for controlling audiotex services which is analogous to the means by which users operate conventional commercial radios.

SUMMARY OF THE INVENTION

The present invention is a method for controlling audiotex services which transforms the telephone into a radio analogue.

Upon dialing a general audiotex telephone number, a caller hears what sounds like the slow scanning of stations on a radio. The effect is produced by successively transmitting to the called a short excerpt from each of a plurality of available audiotex services. (The effect is similar to that created by the slow turning of the tuner of a conventional consumer radio.) Each audiotex service delivers, in its own excerpt, different information about, for example, sports, weather, travel, etc. As with conventional consumer radio, each audiotex service exhibits a distinctive personality determined by the quality of its speech, music, sound effects, and/or background sounds.

A telephone caller listens to the audio excerpts as the audiotex services are scanned. The caller may stop at any point simply by pressing a key, such as the "0" key, on the telephone keypad. Stopping (which is analogous to tuning to particular station on a radio) allows the telephone caller to hear more than simply an excerpt of a particular audiotex service. Instead, the caller may hear all the information associated with that service (e.g., extended sports information).

If the caller wants to again initiate scanning of the audio excerpts from the audiotex services, the caller presses another key on the telephone keypad such a the "#" key. This key initiates slow forward scanning of the audio excerpts. A third key such as the "*" key may be used to move backwards from one audiotex service to the next. Pressing the "#" key twice in rapid succession is used to jump forwards by skipping over several (e.g. 5) audiotex services and pressing the "*" key twice in rapid succession is used, for example, to jump backwards over several (e.g. 5) audiotex services. In this way, the telephone caller can access, conveniently and rapidly, any available audiotex service.

Once a caller accesses a particular audiotex service, the user can save the particular service, for example, by pressing twice any key "1" through "9" on the telephone keypad. That key is then assigned to the particular audiotex service until the telephone caller reassigns it to a different audiotex service. If the caller hangs up the telephone and then calls the general audiotex number again, the caller can immediately access a preferred station by pressing the previously assigned key once. In effect, the keys 1 through 9 serve as memory keys. This feature is analogous to "memory keys" in commercial radios, which allow assignment of keys to particular radio stations for rapid access of those stations.

The above-described radio analogue method of audio presentation and control for audiotex services improves the usability and accessibility of audiotex services for the mass consumer audience. Specifically, the method:

(1) is very easy to learn because its analogy to radio operation promotes transfer of training from the radio domain to the audiotex domain,
(2) alleviates the navigational problems associated with a menu hierarchy by delivering concatenated excerpts of audiotex services,
(3) consistently assigns telephone keys as directional keys and memory keys and does not reassign them within a particular audiotex transaction,
(4) enables rapid selection of preferred information services and entertainment because selected services can be saved by means of memory keys, and
(5) encourages browsing of audiotex services because of the ease with which scanning of different audiotex services is affected.

Thus, the above-described radio-analogue method for controlling audiotex services represents a significant advance over the conventional methods for controlling audiotex services.

DETAILED DESCRIPTION OF THE INVENTION

Figure 1:
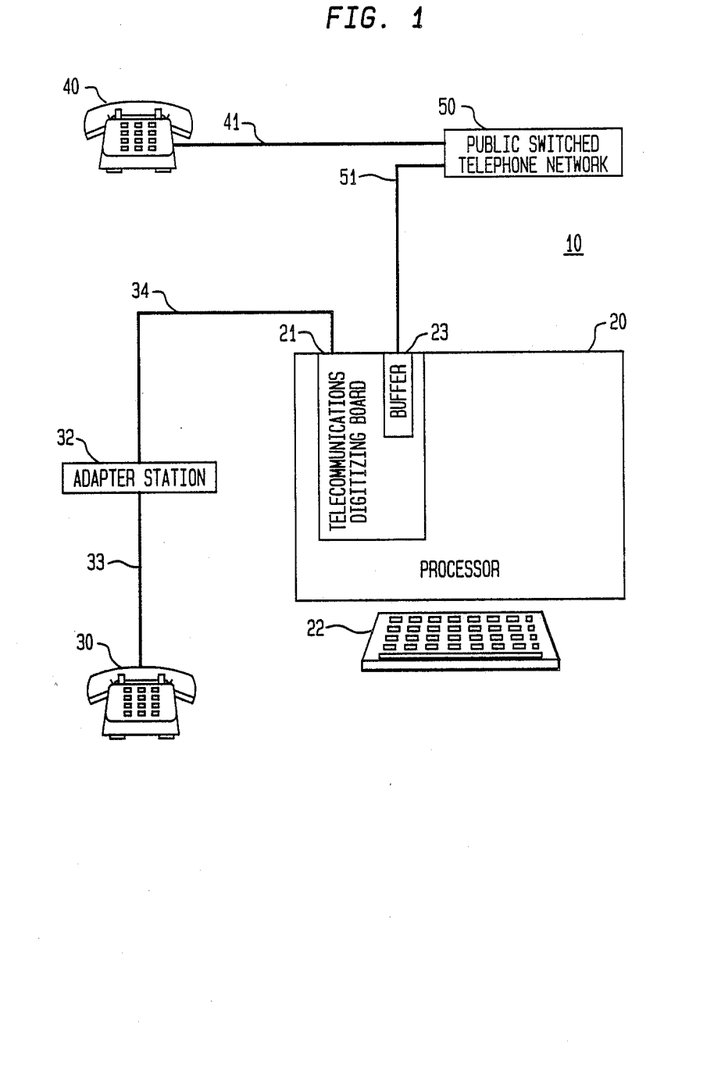
FIG. 1 schematically illustrates a hardware configuration for providing audiotex services.

A system 10 used for implementing audiotex services is illustrated in FIG. 1. The system 10 comprises a processor 20 which illustratively is an IBM PC/AT or a clone thereof. The processor 20 is programmed by means of the keyboard 22.

The processor 20 includes a telecommunications digitizing board 21 (analog-to-digital and digital-to-analog conversion) which illustratively fits into an expansion slot if the processor is an IBM PC/AT or a clone thereof. The digitizing board 21 receives analog telephone signals from the telephone 30, digitizes the analog signals, and writes the digitized signals into files of a disk memory (not shown) associated with the processor 20. The digitizing board 21 can playback a digitized audio file stored in the disk memory by converting the file into an analog telephone signal. The telephone 30 connects to the digitizing board 21 via the cable 33, the adapter station 32, and the cable 34. The adapter station 32 includes a set of jacks for enabling the telephone 30 to be connected via the cable 34 to the digitizing board 21. The digitizing board 21 and adapter station 32 comprise the Dialog 40A or 41 Voice Communciation System available from Dialogic Corporation, Parsippany, N.J. The digitizing board 21 may be controlled by a program known as the VBASE 40, Voice Prompt Editor/Generator. This program is available from Stok Software, Inc. and Dialogic.

An operator of audiotex services writes information into a number of files of a disk memory associated with the processor 20 via the telephone 30, the adapter station 32 and the digitizing board 21. The operator can control the writing of the information by way of the keyboard 22 through use of the above-mentioned program.

A customer accesses the audiotex services using the telephone 40. The customer dials a particular telephone number and is connected to the digitizing board 21 of the audiotex processor 20 via the public switched telephone network 50 and the lines 41, 51. The customer can then access the audiotex information stored in the processor disk memory by transmitting DTMF signals to a buffer 23 of the digitizing board 21 in response to audible prompts generated by the digitizing board. To transmit particular information to the user, the digitizing board 21 converts digitized information into analog telephone signals. As indicated above, the audible prompts are conventionally presented as a hierarchy of menus, and the user indicates a choice at each stage of the hierarchy by pressing one or more keys of his telephone to generate the DTMF signals which are received at the buffer 23 of the digitizing board 21. The DTMF signals received at the buffer 23 are used by the digitizing board 21 and the processor 20 to generate branching instructions. In contrast, in accordance with the present invention, a radio-analogue method is used to control audiotex service transactions. Thus, while DTMF signals received at the buffer 23 are still used to generate branching instructions, the decision tree hierarchy of menus is eliminated in the present invention.

Figure 2:
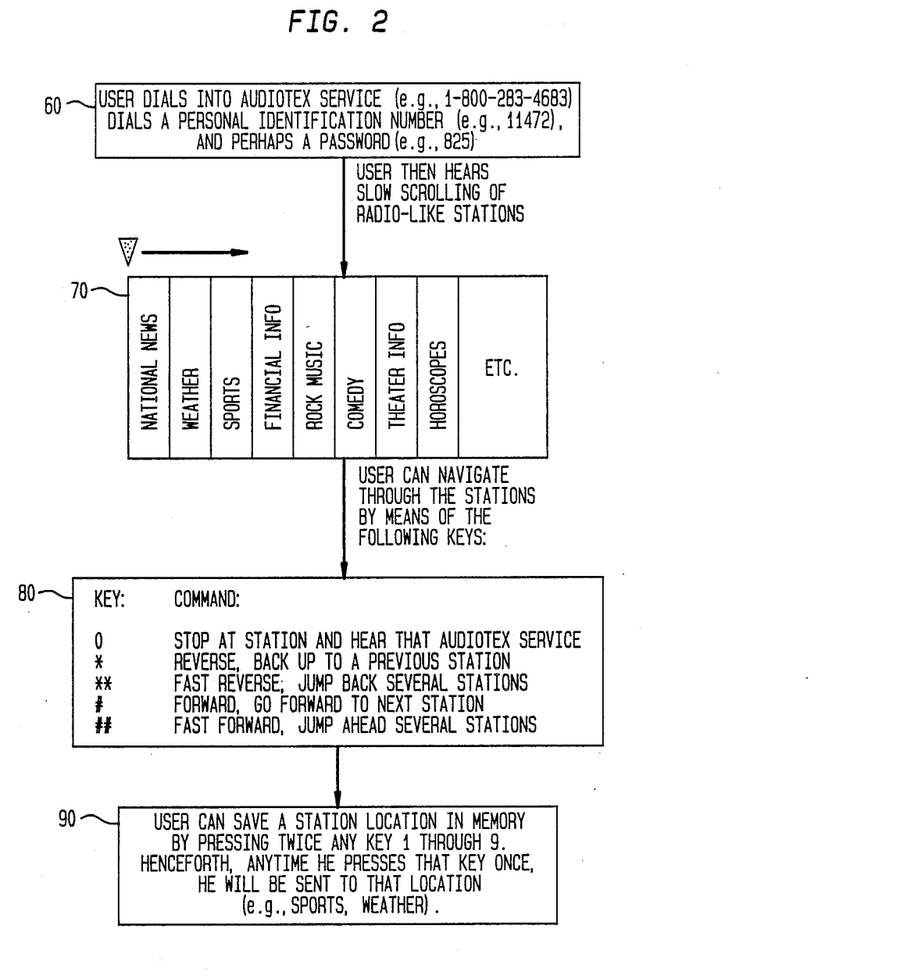
FIG. 2 schematically illustrates the presentation and control of audiotex services, in accordance with an illustrative embodiment of the present invention.

An overview of the inventive method for presenting audiotex services to a user and for enabling a user to control transactions of the audiotex services is shown in FIG. 2. As indicated above, a user may be connected to an audiotex processor via the public switched telephone network by dialing a telephone number followed by a personal identification number and possibly a password (FIG. 2, box 60). The user then hears a slow scanning of a plurality of audiotex services which supply information concerning news, weather, sports, financial information etc. (FIG. 2, Box 70).

The functions performed by the keys at the user's telephone keypad are summarized in box 80 of FIG. 2. The key "0" halts the scanning so that the user can hear the information of a particular audiotex service. The key "*" enables the user to move backwards from one audiotex service to the next. The pressing of the key "*" twice in rapid succession (i.e. "**") enables the user to move backwards rapidly by jumping over several audiotex services. Pressing the key "#" causes a slow scanning of the audiotex services in the forward direction and pressing the key "#" twice in rapid succession (i.e. "##") enables the user to move forward rapidly by jumping over several (e.g. 5) audiotex services. A user can save a particular audiotex service location in memory by twice pressing any key "1" through "9". Henceforth, any time the user presses that key once he will be sent to that particular audiotex service (FIG. 2, Box 90).

The inventive method for accessing and controlling audiotex services may be understood in greater detail from the flow chart of FIGS. 3a-3f. In FIGS. 3a-3f circled capital letters A, B, C, D, E, F, G do not indicate processing steps, but are placeholders which indicate how control is transferred among the various FIGS. 3a-3f.

Figure 3A:
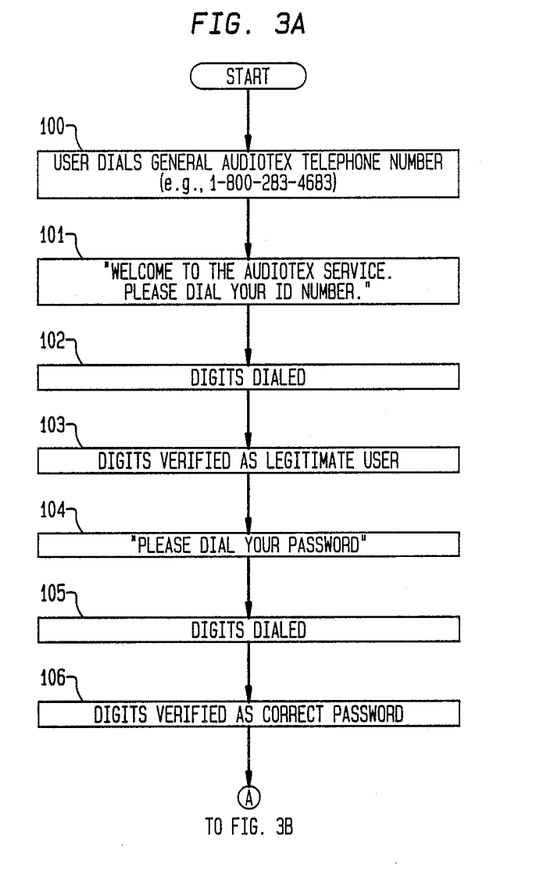
FIGS. 3a-3f comprise a flowchart for the presentation and control of audiotex services in accordance with an illustrative embodiment of the present invention.

As indicated above, a user obtains access to the audiotex processor 20 by dialing a general audiotex number (FIG. 3a, box 100). The user will then receive an audible prompt requesting an ID number (FIG. 3a, box 101). In response, the user enters his ID number using his telephone keypad (FIG. 3a, box 102). The processor verifies that the user is a legitimate user (FIG. 3a, box 103) and provides the user with an audible prompt to dial a password (FIG. 3a, box 104). In response the user enters his password using the telephone keypad (FIG. 3a, box 105) and the processor verifies that the password is correct (FIG. 3a, box 106). To verify the user ID number and the password, the processor may use a lookup table containing legitimate user IDs and associated passwords.

As indicated previously, the processor 20 (see FIG. 1) stores a set of digitized files { ... N−2,N−1,N,N+1,N+2 ... } that contain audio for various audiotex services For each file, an initial excerpt of perhaps a two-second duration has been determined.

Figure 3B:
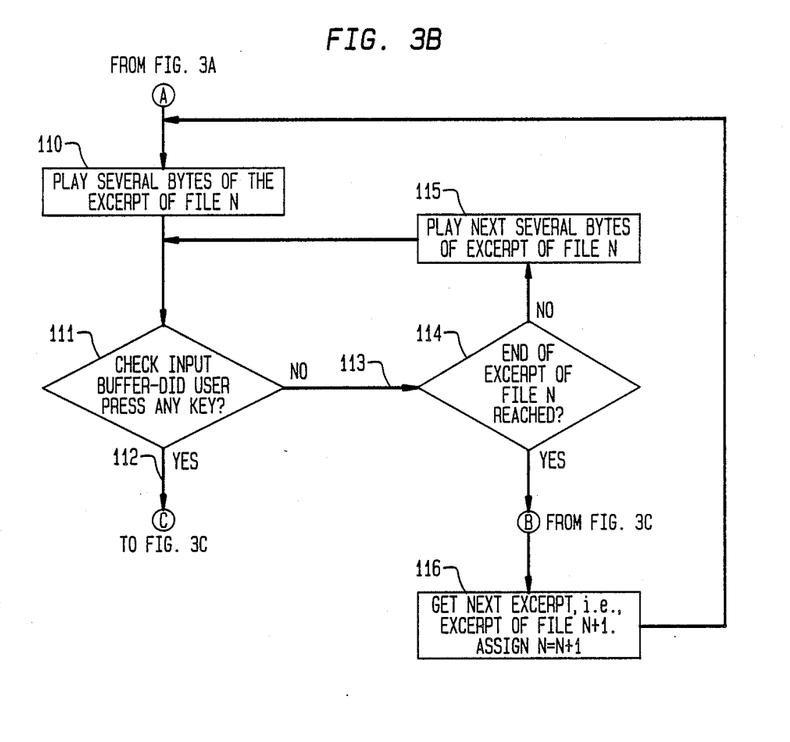

After the user obtains access to the audiotex services in the manner indicated above, the audiotx stations are scanned as follows. For example several bytes of the excerpt of file N are played for the user (FIG. 3b, box 110). After the several bytes are played, an input buffer 23 associated with the digitizing board 21 (see FIG. 1) is checked to determine if the user pressed a key on his keypad (FIG. 3b, box 111). If the user has pressed a key, the program branches to the path 112 which is illustrated in more detail in FIG. 3c. If the user has not pressed a key, the program branches along path 113. In this case, a test is made to determine if the end of the excerpt of file N has been reached (FIG. 3b, box 114). If the end of the excerpt of file N has not been reached, the next several bytes of the excerpt of file N are played for the user (FIG. 3b, box 115) and the program continues with box 111. If the end of the excerpt of file N has been reached, the excerpt from the file N+1 is retrieved, N is set equal to N+1 (FIG. 3b, box 116) and the program continues with box 110.

In this manner, the excerpts of files N, N+1 etc. (corresponding to the audiotex services N, N+1 etc.) are played for the user. This creates an effect of scanning the audiotex services, which effect is analogous to slowly scanning the stations which are available via a commercial radio. However, as soon as a key is pressed by a user, the scanning is stopped and control is transferred in accordance with the particular key pressed by the user. FIGS. 3c, 3d, 3e, and 3f show how control is transferred for each of the keys which may be pressed by a user.

Figure 3C:
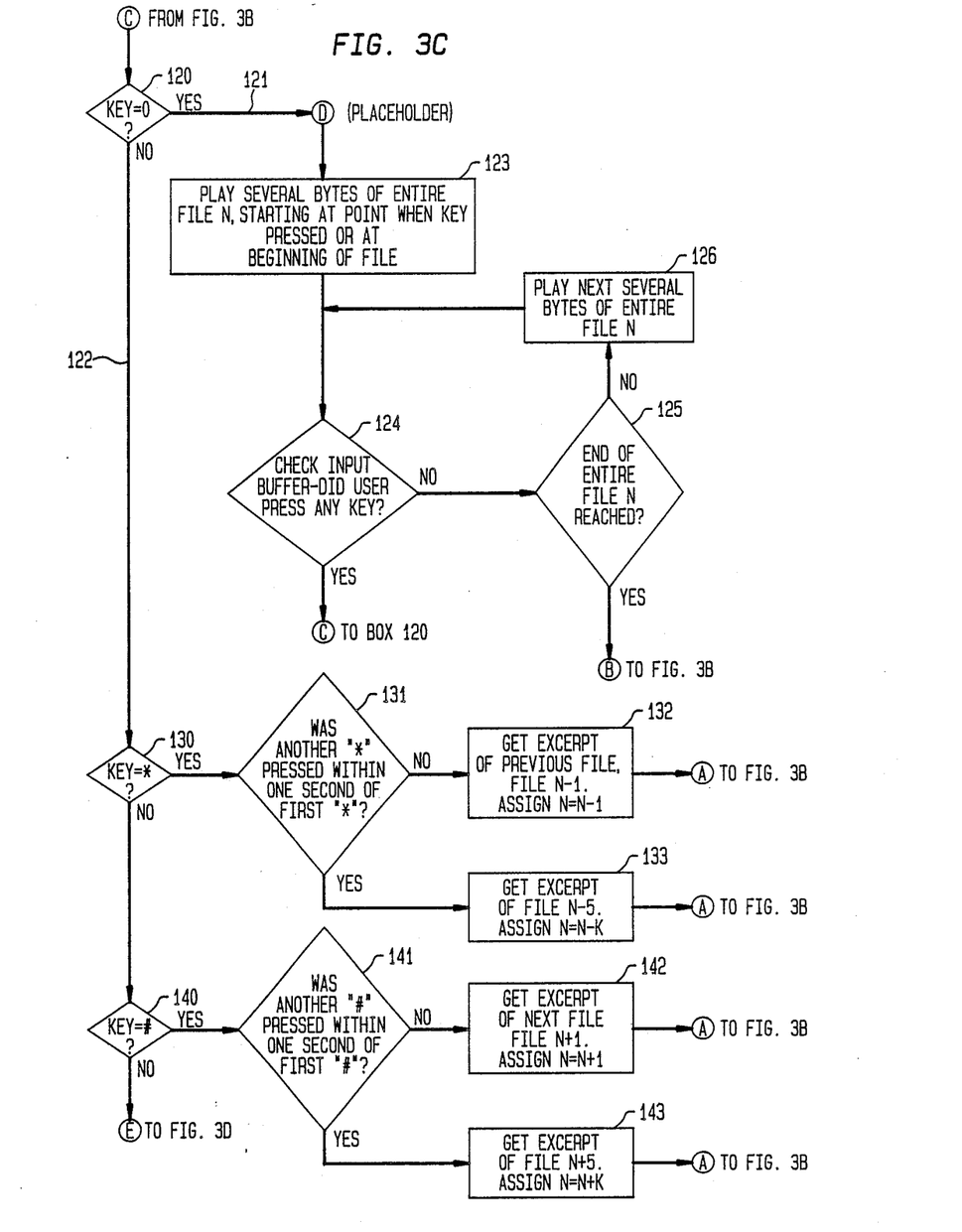

As shown in FIG. 3C, a test is made to determine if the user pressed the "0" key on the telephone keypad (FIG. 3c, box 120). If the "0" key has been pressed, the program branches along the path 121. If the "0" key has not been pressed, the program branches along the path 122 to determine which other key has been pressed.

If the "0" key has been pressed, scanning of the audiotex services is stopped. Several bytes of the entire file N, starting, for example, at the point where the "0" key is pressed, are played for the user (FIG. 3c, box 123). After several bytes are played, the buffer 23 (see FIG. 1) is checked to determine if the user has pressed a key (FIG. 3c, box 124). If the user has pressed a key control is transferred to the box 120 as indicated by the placeholder C. If the user did not press a key, a test is performed to determine if the end of the entire file N has been reached (FIG. 3c, box 125). If the end of the entire file N has not been reached, the next several bytes of the entire file N are played for the user (FIG. 3c, box 126) and the program resumes at box 124. If the end of the entire file N has been reached, control is transferred as indicated by the placeholder B.

If the test performed at box 120 indicates that the user did not press the key "0", a test is made to determine if the user pressed the key "*" (FIG. 3a, box 130). If the user pressed the key "*", control is transferred to the box 131 which determines if a second "*" was pressed within one second of the first "*". If only one "*" was pressed, the user moves backwards one audiotex service. Thus, the excerpt of the previous file N−1 is fetched and N is set equal to N−1 (FIG. 3c, box 132). Control of the program is then transferred in accordance with the placeholder A. If two "*"'s have been pressed (i.e. "**"), the user moves backwards rapidly by skipping over several audiotex services. This is accomplished by fetching the excerpt of file N−K (where K is an integer such as 5) and setting N equal to N−K (FIG. 3c, box 133). Control is then transferred in accordance with placeholder A.

If the test at box 130 of FIG. 3c indicates that the "*" key was not pressed by the user, a test is performed to determine if the "#" key was pressed by the user (FIG. 3c, box 140). If the "#" key was pressed, a test is performed to determine if a second "#" was pressed within one second of the first "#" (FIG. 3c, box 141). If there is no second "#", slow scanning of the audiotex services in the forward direction is initiated. Thus, the excerpt of the file N+1 is fetched and N is set equal to N+1 (FIG. 3c, box 142). Control is then transferred in accordance with placeholder A. If the second "#" has been pressed, the user moves forward rapidly by skipping over several audiotex services. In particular, the excerpt of the file N+K is retrieved and N is set equal to N+K (FIG. 3c, box 143). Control is then transferred in accordance with the placeholder A.

If the test at box 111 of FIG. 3b indicates a key was pressed, but the user did not press "0", "*", or "#", then one of the keys "1" to "9" was pressed. As indicated above, the keys "1" to "9" are memory keys. The control transfers resulting from pressing the keys "1" to "9" are set forth in FIGS. 3d, 3e, and 3f.

Figure 3D:
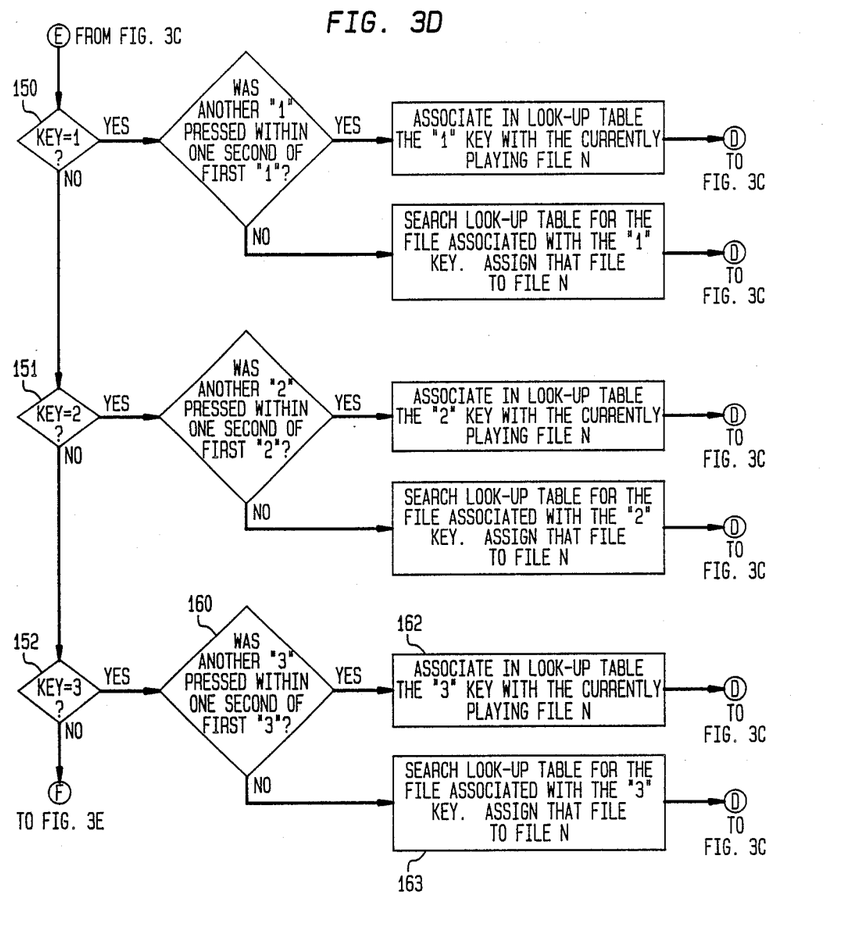
Figure 3E:
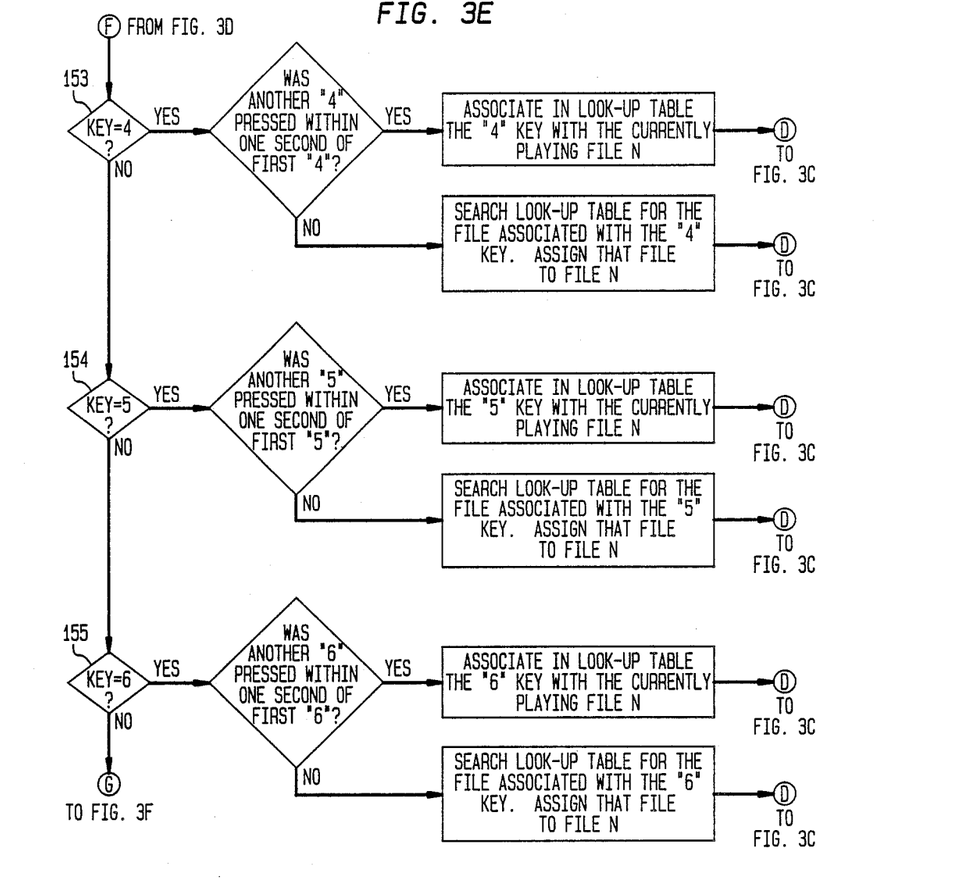
Figure 3F:
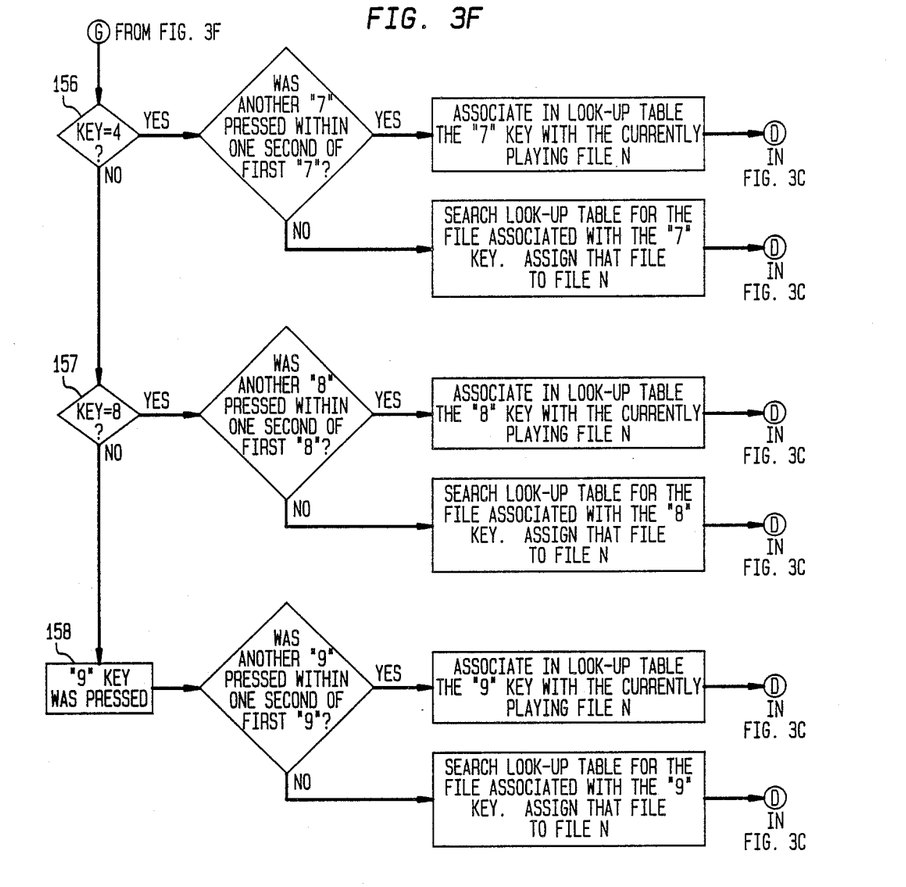

Tests are performed in sequence to determine which of the keys "1" through "8" have been pressed (FIGS. 3d-3f, boxes 150, 151, 152, 153, 154, 155, 156, 157). If none of the keys "1" through "8" have been pressed, then key "9" (FIG. 3f, box 158) has to be the key that was detected at box 111 of FIG. 3b. The control transfers caused by each of the keys "1" through "9" are identical. Thus, for purposes of illustration, only the key "3" is considered. If the test at box 152 of FIG. 3d indicates a "3" was pressed, a test is performed to see if a second "3" was pressed within one second of the first "3" (FIG. 3d, box 160). If a second key "3" was pressed, the processor 20 (see FIG. 1) associates in a lookup table the "3" key with the currently playing file N (FIG. 3d, box 162). Control is then transferred in accordance with the placeholder D. If a second key "3" was not pressed, the processor 20 searches a lookup table for the file associated with the key "3" and N is set equal to that particular file (FIG. 3d, box 163). Control is then transferred in accordance with placeholder D.

As indicated above, if "*" is pressed the user moves backward one audiotex service. This is accomplished according to the flowchart of FIGS. 3a-3f by fetching the excerpt of the previous file N−1 and setting N equal to N−1 (FIG. 3c, box 132). Control is then transferred in accordance with placeholder A which causes slow forward scanning of the audiotex services by successively fetching and playing excerpts from the audiotex files N+1, N+2 etc. (FIG. 3b, boxes 110, 111, 114, 115, 116). Similarly, after "**" is pressed and the user jumps backwards by skipping over several audiotex services, slow forward scanning of the audiotex services takes place. In addition, after "##" is pressed and the user jumps forward by skipping over several audiotex services, slow forward scanning of the audiotex services takes place.

In an alternative embodiment of the invention, slow scanning in the backwards directions may be desired. In this case, after an excerpt from a file N is played, an excerpt from a file N−1 is played, etc. This type of reverse scanning can be implemented by modifying the flowchart of FIGS. 3a–3f to include a flowchart branch which is identical to the flowchart branch of FIG. 3b except that the expression N+1 in box 116 of FIG. 3b is replaced with the expression N-1. Thus, whenever the end of an excerpt of file N is reached, the excerpt from the file N−1 is fetched and played rather than the excerpt from the file N+1.

Similarly, a type of fast scanning in the backwards direction may be implemented by modifying the flowchart of FIGS. 3a–3f to include a flowchart branch which is identical to the flowchart branch of FIG. 3b except the expression N+1 in box 116 of FIG. 3b is replaced with the expression N-K. In this case, whenever the end of an except of a file N is reached the excerpt from the file N−K is fetched and played rather than the excerpt from the file N+1 so that the user hears an excerpt from every $K^{th}$ audiotex file in the backwards direction.

In yet another alternative embodiment of the invention, a type of fast scanning in the forwards direction may be implemented by modifying the flowchart of FIGS. 3a–3f to include a flowchart branch which is identical to the flowchart branch of FIG. 3b except the expression N+1 in box 116 of FIG. 3b is replaced by the expression N+K. In this case, whenever the end of an excerpt of a file N is reached the excerpt of the file N+K is fetched and played rather than the excerpt from the file N+1 so that the user hears an excerpt from every $K^{th}$ audiotex file in the forward direction.

In short, a new method for the presentation and control of audiotex services has been disclosed. In accordance with the inventive method, audiotex services are controlled by users utilizing a method analogous to the method by which commercially available radios are controlled. It should be noted that the above-described embodiments of the invention are intended to be illustrative only. Numerous alternative embodiments of the invention may be devised by those skilled in the art without departing from the spirit an scope of the following claims.

I claim:

1. A method for presenting and controlling audiotex services comprising the steps of
   in response to a telephone call received at an audiotex processor from a user, playing for the user via the public switched telephone network, an excerpt from each of a plurality of audiotex services in a sequence, and
   in response to a DTMF signal generated at a telephone of said user and received at said audiotex processor, halting the sequential playing of said excerpts and playing for said user additional information from one of said audiotex services.

2. The method of claim 1 wherein said one audiotex service is the audiotex service whose excerpt was being played at the time said DTMF signal was received.

3. The method of claim 1 wherein said method further comprises the step of
   in response to a further DTMF signal generated at a telephone of said user and received at said audiotex processor, resuming the sequential playing of excerpts from said audiotex services.

4. The method of claim 1 wherein said method further comprises the step of
   in response to a further DTMF signal generated at a telephone of said user and received at said audiotex processor, playing the excerpt from the audiotex service immediately preceding said one audiotex service in said sequence.

5. The method of claim 1 wherein said method further comprises the step of
   in response to a further DTMF signal generated at a telephone of said user and received at said audiotex processor sequentially playing said excerpts from said audiotex services in a reverse direction.

6. The method of claim 1 wherein said method further comprises the step of
   in response to a further DTMF signal generated at a telephone of said user and received at said audiotex processor, playing the excerpt from the $K_{th}$ (K>1) audiotex service following said one audiotex service in said sequence.

7. The method of claim 1 wherein said method further comprises the step of
   in response to a further DTMF signal generated at a telephone of said user and received at said audiotex processor, rapidly scanning said excerpts in a forward direction by playing an excerpt from every $K^{th}$ (K>1) audiotex service in said sequence.

8. The method of claim 1 wherein said method further comprises the steps of
   in response to a further DTMF signal generated at a telephone of said user and received at said audiotex processor, playing the excerpt from the $K^{th}$ (K>1) audiotex service preceding said one audiotex service in said sequence.

9. The method of claim 1 wherein said method further comprises the step of
   in response to a further DTMF signal generated at a telephone of said user and received at said audiotex processor, rapidly scanning of said excerpts by playing an excerpt from every $K^{th}$ (K>1) audiotex service in said sequence in a reverse direction.

10. The method of claim 1 wherein said method further comprises the step of
    in response to a further DTMF signal generated at a telephone of said user and received at said audiotex processor, associating a particular DTMF signal with a particular audiotex service.

11. The method of claim 1 wherein said one audiotex service is associated by said processor with said DTMF signal using a lookup table stored in a memory.

12. A method for accessing and controlling audiotex services by a user comprising the steps of:
    dialing at a telephone of said user an audiotex telephone number to achieve a connection with an audiotex processor, after said connection with said audiotex processor is achieved, playing excerpts from a sequence of audiotex files stored at said audiotex processor, and choosing a particular one of said audiotex files by pressing at least a first key at said telephone of said user.

13. The method of claim 12 wherein said excerpts are played sequentially in a forward direction.

14. The method of claim 12 wherein said choosing step comprises the step of stopping said playing of said excerpts at the file whose excerpt is being played at the time said first key is pressed.

15. The method of claim 12 wherein said choosing step comprises associating a particular one of said files with said first key.

16. The method of claim 12 wherein said method further comprises the step of resuming said playing of said excerpts in a forward direction by pressing a additional key at said telephone of said user.

17. The method of claim 12 wherein said method further comprises the step of playing the excerpt from the audiotex file immediately preceding said one audiotex file in said sequence by pressing an additional key at said telephone of said user.

18. The method of claim 12 wherein said playing step comprises sequentially playing said excerpts from said audiotex files in a reverse direction.

19. The method of claim 12 wherein said method further comprises the step of playing the excerpt from the $K^{th}$ ($K > 1$) audiotex file following said one audiotex file in said sequence by pressing an additional key at said telephone of said user.

20. The method of claim 12 wherein said playing step comprises rapidly scanning said excerpts in a forward direction by playing an excerpt from every $K^{th}$ ($K > 1$) audiotex file in said sequence.

21. The method of claim 12 wherein said method further comprises the step of playing the excerpt from the $K^{th}$ ($K > 1$) audiotex service preceding said one audiotex service in said sequence in response to pressing an additional key at said telephone of said user.

22. The method of claim 12 wherein said playing step comprises rapidly scanning said excerpts in a reverse direction by playing an excerpt from every $K^{th}$ ($K > 1$) audiotex service in said sequence in a reverse direction.

23. The method of claim 12 wherein said method further comprises the step of associating a particular key at the telephone of said user with a particular audiotex file so that the user can access the particular file by pressing the particular key.

24. A method for presenting audiotex services to a user comprising the steps of (a) playing one or more bytes of an excerpt of an audiotex file N to a user, said file N being one out of a plurality of audiotex files ... N−1,N,N+1 ..., each of which files includes a predefined excerpt, (b) determining whether or not said user has pressed a key at a telephone, (c) if the user has not pressed a key, determining whether the end of the excerpt of the file N has been reached, (d) if the end of the excerpt of the file N has not been reached, playing the next one or more bytes of the excerpt of file N and continuing with step (b), and (e) if the end of the excerpt of the file N has been reached, fetching the excerpt of the audiotex file N+1, assigning the value N+1 to N, and continuing with the step (a).

25. The method of claim 24 wherein said user has pressed a key and wherein said method further comprises the step of (f) determining which key the user has pressed.

26. The method of claim 25 wherein said user has pressed a first key and said method further comprises the steps of (g) playing several bytes of the entire file N, (h) determining whether the user has pressed a key at said telephone, if the user has pressed a key continuing with step (f), (i) if the user has not pressed a key, determining if the end of the entire file N has been reached, if the end of the entire file N has been reached continuing with step (e), (j) if the end of the entire file N has not been reached, playing the next several bytes of the entire file N and continuing with step (h).

27. The method of claim 25 wherein said user has pressed a second key at said telephone and said method further comprises the steps of:

determining whether said second key was pressed twice, if said second key was not pressed twice getting the excerpt of the audiotex file N−1, assigning the value N−1 to N, and continuing with step (a), and if said second key was pressed twice, getting the excerpt of the audiotex file N−K (where K is an integer) assigning the value N−K to N and continuing with step (a).

28. The method of claim 25 wherein said user has pressed a third key and said method further comprises the steps of determining whether said third key was pressed twice, if said third key was not pressed twice, getting the excerpt of the audiotex file N+1, assigning the value N+1 to N, and continuing with step (a), and if said third key was pressed twice, getting the excerpt of the audiotex file N+K (where K is an integer) assigning the value N+K to N, and continuing with step (a).

29. The method of claim 25 wherein said user has pressed a fourth key and said method further comprises the steps of:

determining whether said fourth key was pressed twice, if said fourth key was pressed twice, associating said fourth key with the audiotex file N and continuing with step (g), and if said fourth key was not pressed twice, searching a lookup table for an audiotex file associated with said fourth key, assigning that file to file N, and continuing with step (g).

* * * * *